Nov. 22, 1955  F. W. CRAWFORD  2,724,304

DIFFERENTIAL REFRACTOMETER

Filed Sept. 29, 1950  3 Sheets-Sheet 1

INVENTOR.
F. W. CRAWFORD

BY

Hudson & Young
ATTORNEYS

INVENTOR.
F. W. CRAWFORD
BY
Hudson & Young
ATTORNEYS

Nov. 22, 1955  F. W. CRAWFORD  2,724,304
DIFFERENTIAL REFRACTOMETER
Filed Sept. 29, 1950  3 Sheets-Sheet 3
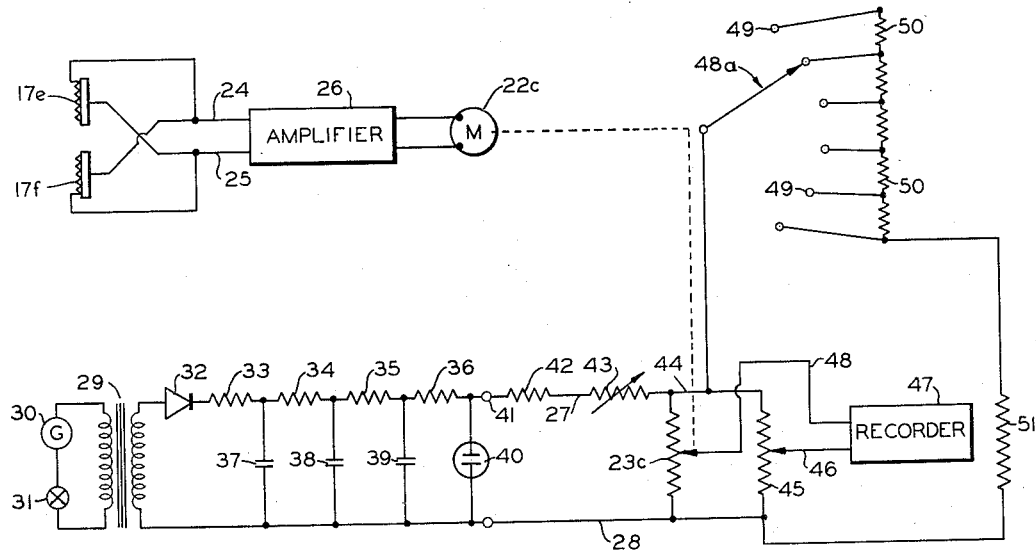
FIG. 4.
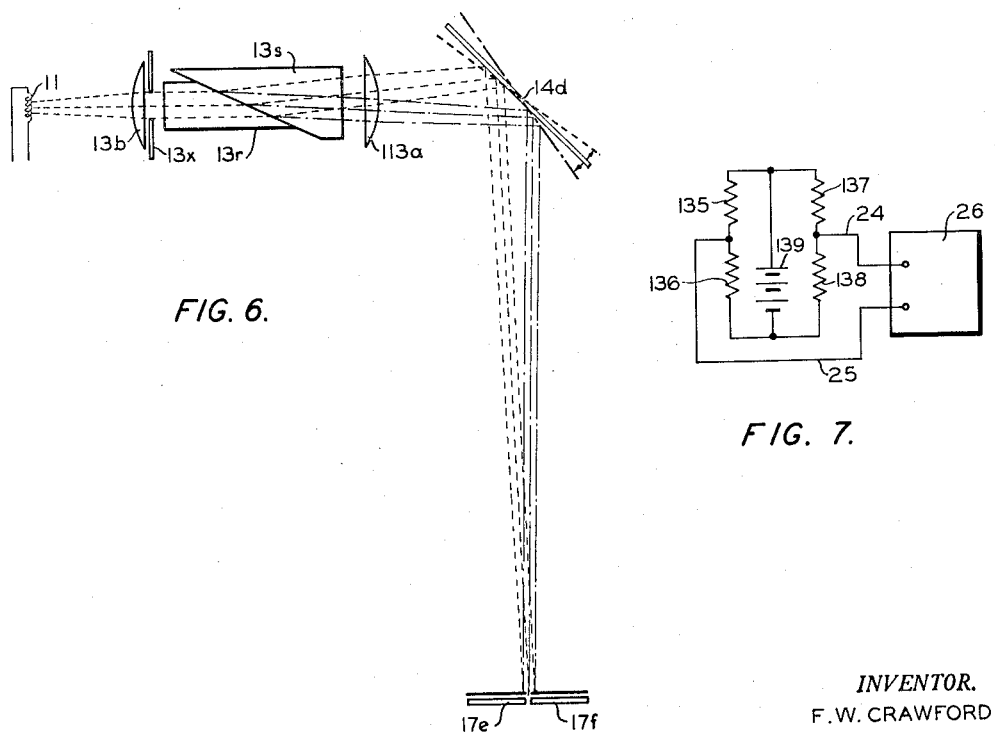
FIG. 6.
FIG. 7.
INVENTOR.
F. W. CRAWFORD
BY
Hudson & Young
ATTORNEYS

United States Patent Office 2,724,304
Patented Nov. 22, 1955

2,724,304

DIFFERENTIAL REFRACTOMETER

Francis W. Crawford, Bartlesville, Okla., assignor to Phillips Petroleum Company, a corporation of Delaware Application September 29, 1950, Serial No. 187,600

11 Claims. (Cl. 88—14)

This invention relates to apparatus for analyzing a desired process or sample stream. In one specific aspect, it relates to the use of a differential refractometer in such apparatus. In another specific aspect, it relates to apparatus for adjusting the sensitivity and range of recording apparatus. In still another specific aspect, it relates to apparatus for maintaining equal temperatures and pressures at both cells of a differential refractometer.

Heretofore, considerable difficulty has been experienced in providing a simple, reliable mechanism for indicating the composition of process streams, and for the indication and control of various process variables. In accordance with this invention, I provide such apparatus at very low cost by utilizing the principle of differential refraction whereby the refractive index of a sample or stream to be analyzed is compared with the refractive index of a standard fluid or with that of a second sample or stream, the apparatus automatically indicating the difference in refractive index, which is a measure of the relative compositions of the two streams or samples. This difference in refractive index may be recorded and, for this purpose, I provide a novel circuit for controlling the range and sensitivity of the recorder so that either small or large changes in relative refractive index may produce full scale deviations of the recorder pen. Manifestly, the difference in refractive index may be utilized in many automatic control operations, such as control of a stabilizing column in a refinery by automatic variation of heat supplied to the column, the reflux ratio, the feed rate, or other process variable. In fact, the apparatus of my invention is useful in either indicating or automatic control operations wherever variations in the composition of a stream produce detectable changes in its refractive index. I also provide means for effecting a close control of the temperature and pressure of fluids passed to the refractometer so that such variations do not affect the output of the apparatus.

It is an object of this invention to provide an improved continuous analyzing device utilizing the principle of differential refraction.

It is a further object to provide a recording system of improved character to record the data produced by the differential refractometer.

It is a still further object to provide an improved optical and balancing system for such a device.

It is a still further object to provide means for effecting close control of temperature and pressure in such a device.

It is a still further object to provide apparatus which is rugged in construction, durable and economical to build and manufacture.

Various other objects, advantages and features of the invention will become apparent from the following detailed description taken in conjunction with the accompanying drawings, in which:

Figure 4 is a schematic circuit diagram of the refractometer;

Figure 6 is a schematic view of an optical system utilizing the cell of Figure 5; and Figure 7 is a schematic circuit diagram of a modified photoelectric cell circuit.

Figure 1:
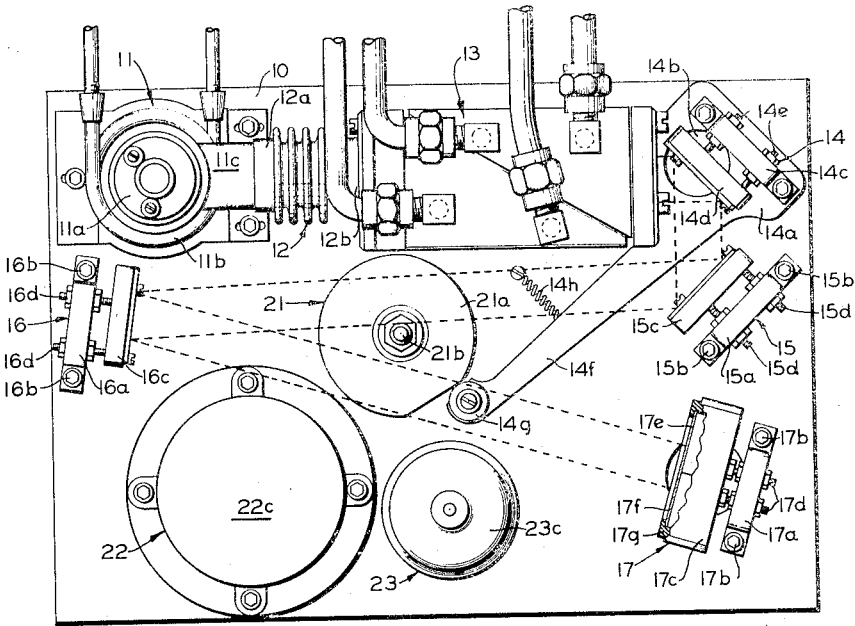
Figure 1 is a top view of the refractometer of my invention.
Figure 2:
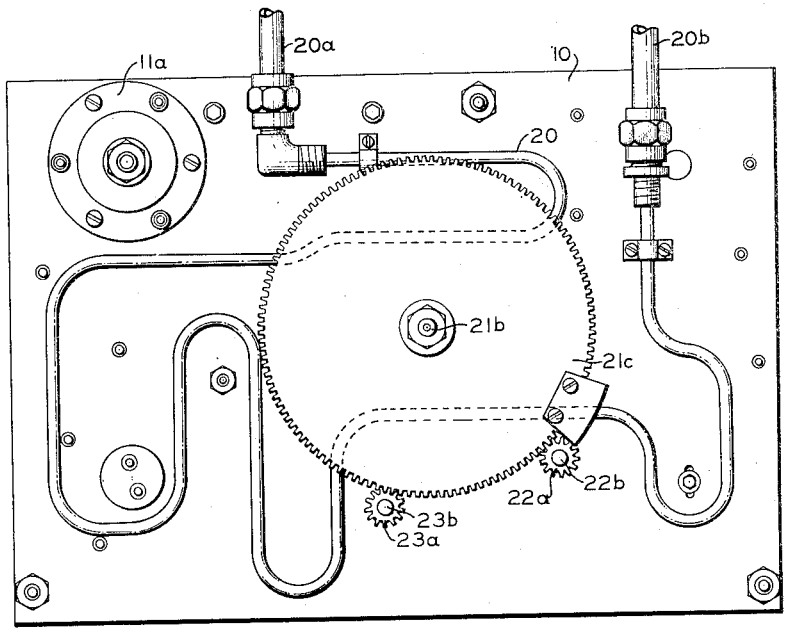
Figure 2 is a bottom view of the apparatus of Figure 1.

Referring now to Figure 1, the apparatus includes a base 10 upon which is mounted a radiation source 11 to direct a radiation beam through an adjustable coupling or bellows 12 to a differential refractometer cell 13, the beam being displaced in cell 13 by an amount which is proportional to the difference in refractive index of the two fluids contained therein. After leaving the cell 13, the beam is reflected by a movable mirror assembly 14 and stationary mirror assemblies 15, 16 to a dual or twin radiation detector 17. The beam is adjusted automatically by movement of mirror assembly 14 until it is centered upon the dual detector assembly 17, the amount of rotation of assembly 14 necessary to effect this adjustment being a measure of the difference in refractive index of the two fluids within cell 13.

In a preferred embodiment of the invention, the source 11 is an ordinary incandescent bulb producing visible light which is mounted within a housing 11a, this housing having a cooling coil or pipe 11b disposed in heat transfer relation therewith to dissipate the heat produced by the bulb. Light produced by the bulb is directed through a tube 11c and, thence, through bellows 12 to the cell 13, the bellows having a collar 12a at one end thereof which is connetced to tube 11c and having a collar 12b at its other end which is connected to a flanged collar 13a, Figure 3, of the cell unit 13. It will be apparent that the bellows 12 serves as an adjustable coupling between the source 11 and the cell 13.

A lens 13b, which is mounted between collar 13a and an annular member 13c, as by suitable screws, one of which is shown at 13d, collimates the light passing through the tube 11c and bellows 12 so that a beam passes through a baffle 13x which prevents light from reaching the cell walls of the cell assemblies now to be described. These cell assemblies are formed from two complementary metal blocks 13e, 13f which define an interior passage closed at one end thereof by a transparent window 13g mounted between block 13e and annular member 13c, this window having a sealing gasket 13h in contact therewith to prevent escape of liquids from the interior of the cell unit. The other end of the passage is closed by a similar window 13i which is mounted between block 13f and an annular member 13j, this window also being provided with a sealing gasket 13k. Annular member 13c is secured to block 13e by a plurality of screws, one of which is shown at 13m, and, in similar fashion, annular member 13j is attached to block 13f by a plurality of screws, one of which is shown at 13n. The blocks 13e and 13f have interfitting portions 13o so that, when they are assembled, a rigid unitary structure is formed.

A diagonal transverse plate 13p of transparent material is mounted between the blocks 13e and 13f, this plate being provided with a sealing gasket 13q and dividing the interior passage of the cell into two chambers 13r and 13s. Chamber 13r is provided with an inlet conduit 13t and a valved outlet conduit 13u while chamber 13s, of slightly greater diameter, is provided with an inlet conduit 13v and a valved outlet conduit 13w.

In operation of the cell, chamber 13s is filled with a standard fluid while chamber 13r is filled with a fluid to be analyzed which may be continuously circulated therethrough, if desired. Light entering the cell through collar 13a is collimated by lens 13b and passes, as a beam, through window 13g, and plate 13p, the beam then leaving the cell through window 13i and passing to the movable mirror assembly 14. If the refractive index of the liquids in the two cells is identical, the beam leaves the cell in an axial path but, if the refractive index of the liquids differs, the beam is deviated from its axial path by an amount proportional to the difference in refractive index between the two liquids. Instead of containing a standard liquid, the chamber 13r can contain any other fluid with which it is desired to compare the refractive index of a process stream or other streams to be analyzed. For example, a second process stream can be passed continuously through cell 13r and the deviation of the beam from its axial path is then continuously proportional to the difference in refractive index between the two streams.

It is important that a close control of temperature and pressure of the cell 13 be maintained, particularly when viasible radiation is utilized, although control of these conditions is also important when ultra-violet, infra-red or other types of radiation are used. In order to regulate the pressure, that is, to maintain the same pressure in the two chambers 13r and 13s I provide an equalizing device 18 formed from a tubular piece 18a of metal defining an interior chamber 18b having a threaded opening 18c therein into which the conduit 13v is fitted, this chamber also communicating through a bore 18d and a nipple or fitting 18e with a valved conduit 18f. Accordingly, the pressure within chamber 18b is the same as that in chamber 13s. Mounted in the chamber 18b is a bellows 18g which communicates through a bore 18h and a coupling 18i with a valved inlet conduit 18j. The interior of the bellows also communicates by a bore 18k and a fitting 18m with the inlet conduit 13t of chamber 13r. As a result, the pressure interiorly of the bellows 18g is the same as that existing in chamber 13r. It will be apparent that the bellows 18g expands or contracts, thereby changing the relative volumes of the chambers 18h, 13r and 18b, 13s until the pressures therein are equal. Only a small variation in pressure ordinarily need be compensated for by the equalizer 18 and it functions in a very sensitive manner to equalize the pressures in the two chambers.

Temperature control of the cell unit 13 is effected by forming the blocks 13e, 13f from a metal which is a good conductor of heat and by making these blocks sufficiently massive to serve as a reservoir thermally contacting the chambers 13r and 13s. In this connection, it will be noted that increases or decreases in the temperature of the cell as a whole does not have any substantial effect upon the bending of the beam passing through the cell. However, even a small temperature variation between the fluids in the two cells may result in errors. Thus, the described construction of unit 13, while it does not eliminate temperature variations of the whole cell, provides efficient heat transfer characteristics such that the fluids in the two cells remain at almost exactly the same temperature.

A further improvement in the described temperature control is effected by passing the material to be analyzed through a conduit 19a to a rather large storage vessel 19b and, thence, through the conduit 18j and the pressure equalizer 18 to cell 13r. Even rather large variations in the temperature of the fluid entering through line 19a produce only small changes in the temperature of the entire body of liquid within the vessel 19b with the result that the temperature variations in fluid fed to the cell unit are very small. These small variations in temperature of the fluid in chamber 13r are readily transferred to the fluid in chamber 13s by the efficient heat transfer construction of the cell with the result that the two bodies of fluid remain accurately at the same temperature. This contributes materially to the accuracy of the analysis performed by this apparatus.

Large temperature variations are also prevented by the coil 11b which carries away most of the heat produced by the source 11 and by metal tubing 20 which is disposed in a sinuous path at the underside of the base 10, cooling fluid being circulated through this tube from an inlet conduit 20a and passing through the tube to an outlet conduit 20b. This tends to maintain the base, and thereby the cell unit 13, at a constant temperature.

Referring now to Figure 1, the movable mirror assembly 14 includes a base 14a which is pivotally mounted at 14b to the base 10, the base 14a carrying a bracket 14c to which a plane mirror 14d is adjustably secured by screws 14e, these screws permitting angular adjustment of the mirror, as desired. Integrally formed with the base 14a is an elongated cam follower arm 14f carrying a cam roller 14g which is urged into engagement with a cam 21a by a spring 14h. The stationary mirror assemblies 15 and 16 include brackets 15a and 16a, respectively, which are secured to the base 10 by screws 15b and 16b, these brackets carrying the respective mirrors 15c, 16c which are secured thereto by adjusting screws 15d and 16d.

The dual detector unit 17 includes a bracket 17a secured to the base 10 by screws 17b, this bracket having a casing 17c secured thereto by adjusting screws 17d. Where visible light is utilized as the radiation for purposes of analysis, the casing 17c includes two photovoltaic cells 17e, 17f mounted within an insulating sleeve 17g which, in turn, is supported within the casing 17c. These cells are symmetrically disposed with respect to the beam of radiation reflected thereon from mirror 16c, mirror 15c and mirror 14d. Where infra-red radiation is utilized, the cells are replaced by bolometers or other suitable detectors of infra-red radiation and, of course, other types of radiation require suitable detectors therefor.

The cam 21a forms a part of a cam assembly 21 which includes a shaft 21b journalled in the base 10 and carrying a gear 21c which meshes with a pinion 22a carried by a shaft 22b, this shaft being geared to an electrical servomotor 22c mounted on heat insulating blocks, not shown, at the upper side of the base 10. The last-mentioned parts make up a motor assembly 22. The gear 21c also meshes with a pinion 23a carried by a shaft 23b which actuates the contactor of a potentiometer 23c mounted at the top of the base 10, these parts making up a potentiometer assembly 23.

Referring now to Figure 4, it will be noted that the radiation detectors 17e, 17f are connected in opposition by conductors 24 and 25 so as to produce a resultant voltage proportional to the difference in intensity of the radiation beams incident upon the two detector units. The voltage appearing between leads 24, 25 is amplified by a unit 26 whose output is fed to the motor 22c, the motor being mechanically connected, as described, to the contactor of potentiometer 23c.

In the operation of the analyzer as thus far described, the mirror assemblies and detector units are so adjusted that equal amounts of light fall upon the respective detector units when there is a desired relationship between the refractive indices of the fluids in the chambers 13r, 13s of cell unit 13. Ordinarily, this relationship holds when the refractive indices of the two fluids are equal. In this condition, the resultant voltage produced by the detector units is zero, and no current is fed to motor 22c. Assuming that the refractive index of the fluid in chamber 13r changes so as to shift the radiation beam in a direction such that more radiation falls upon cell 17e than upon cell 17f, a voltage of one polarity is produced by the interaction of the radiation detectors 17e, 17f. This voltage is amplified by the unit 26 and fed to motor 22c. The resulting movement of motor 22c, pinion 22a, gear 21c, and cam 21a causes arm 14f to move in a clockwise direction, Figure 1, thereby producing a shift in position of the beam such that less radiation is incident upon radiation detector 17e than upon radiation detector 17f. This movement continues until equal amounts of radiation are incident upon the two detectors, at which time movement of the motor is stopped. The extent of movement of the motor 22c and gear 21c is, of course, proportional to the deviation of the refractive index of the fluid in cell 13r from its original or standard value. This deviation is reflected by a corresponding movement of the arm of potentiometer 23c which is connected to gear 21c by pinion 23a.

Assuming that the refractive index of the fluid in chamber 13r varies in such fashion as to cause more radiation to impinge upon detector 17f than upon detector 17e, an opposite effect occurs, the voltage produced between conductors 24, 25 being of opposite polarity and thus causing the arm 14f of assembly 14 to swing in a counterclockwise direction, Figure 1. This produces a shift of the radiation beam in a direction such that less radiation falls upon detector 17f and more radiation falls upon detector 17e, the resulting movement of gear 21c, motor 22c and the arm of potentiometer 23c being proportional to the extent of deviation. It will be apparent, therefore, that the position of motor 22c and the position of the arm of potentiometer 23c is a function of the difference in refractive index of the fluids in chambers 13r, 13s and the potential appearing across this potentiometer is directly representative of this difference in refractive index.

The described system is extremely sensitive since the rotation of mirror assembly 14 produces a linear shift in the radiation beam incident upon the detector assembly 17, this linearity resulting from the fact that the mirror 14d is positioned close to the cell 13. These results are superior to moving the detector assembly itself since small movements of mirror 14d are, in effect, amplified by a factor proportional to the length of the optical path formed by mirrors 15c and 16c.

In accordance with the invention, I also provide a circuit for adjusting the sensitivity and range of a recorder upon which the described variations in refractive index are recorded. To this end, I provide a constant current power supply which produces a constant current through conductor 27. This current is produced by a power supply which includes a transformer 29 having its primary winding connected in circuit with an alternating current source 30 and a switch 31, the secondary winding being connected in circuit with a rectifier 32, filter impedances 33, 34, 35, 36, filter condensers 37, 38, 39 and a voltage regulator tube 40. The positive terminal 41 of this constant voltage power supply is connected to conductor 27 by a resistance 42 of high ohmic value so that a constant current flows through conductor 27.

The conductor 27 is connected through a variable resistance 43 to a lead 44, the fixed terminals of potentiometer 23c being connected to leads 28 and 44, respectively. A potentiometer 45 has its fixed terminals connected to leads 28 and 44, respectively, the contactor of this potentiometer being connected by a lead 46 to one input terminal of a recorder 47, the other input terminal of which is connected by a lead 48 to the contactor of potentiometer 23c. The lead 44 is also connected to the arm of a switch 48a having a series of fixed terminals 49 with fixed resistances 50 connected in shunt with each pair of adjacent fixed terminals. One end of the series of fixed terminals thus formed is connected through a fixed resistance 51 to the lead 28.

In the operation of the circuit of Figure 4, potentiometer 45 controls the reference voltage at one side of the input circuit of recorder 47 so that adjustment of this potentiometer shifts the zero point of the recording upon the tape, the variations in potential at conductor 48 responsive to changes in refractive index of the fluid in chambers 13r, 13s being recorded with respect to the reference voltage established at conductor 46. Adjustment of the arm of switch 48a produces changes in range or sensitivity of the recorder. In this connection, it will be noted that fixed resistors 50, 51 are of low ohmic value with respect to potentiometers 23c and 45. When the arm of the switch 48a is moved so as to decrease the resistance in shunt with potentiometers 23c and 45 the current flow through potentiometers 23c and 45 also is decreased which results in a lower voltage drop across the end terminals of potentiometers 23c and 45. This decrease in voltage drop decreases the sensitivity of the recorder, that is, the recorder requires a greater movement of the contactor of potentiometer 23c to produce a given voltage difference between conductors 46 and 48. Conversely, when switch 48a is moved so as to increase the resistance in shunt with potentiometers 23c and 45, the current flow through potentiometers 23c and 45 also is increased which results in a greater voltage drop across the end terminals of potentiometers 23c and 45. This increase in voltage drop increases the sensitivity of the recorder, that is, the recorder requires less movement of the contactor of potentiometer 23c to produce a given voltage difference between conductors 46 and 48. Variable resistor 43, which has a resistance intermediate that of resistor 42 and potentiometers 23c, 45, is provided to obtain a fine adjustment of sensitivity. That is, adjustment of this resistance produces a small variation in the voltage at conductor 44 which, in turn, produces a small change in the sensitivity of the recorder. In effect, the variable resistor 43 provides a vernier adjustment between the steps in sensitivity obtained by the movement of the arm of switch 48a to its various positions. It will be evident, therefore, that the described circuit enables the zero point of the recorder to be adjusted to any desired point and, also, the circuit allows the sensitivity of the recorder circuits to be continuously varied within wide limits.

Figure 3:
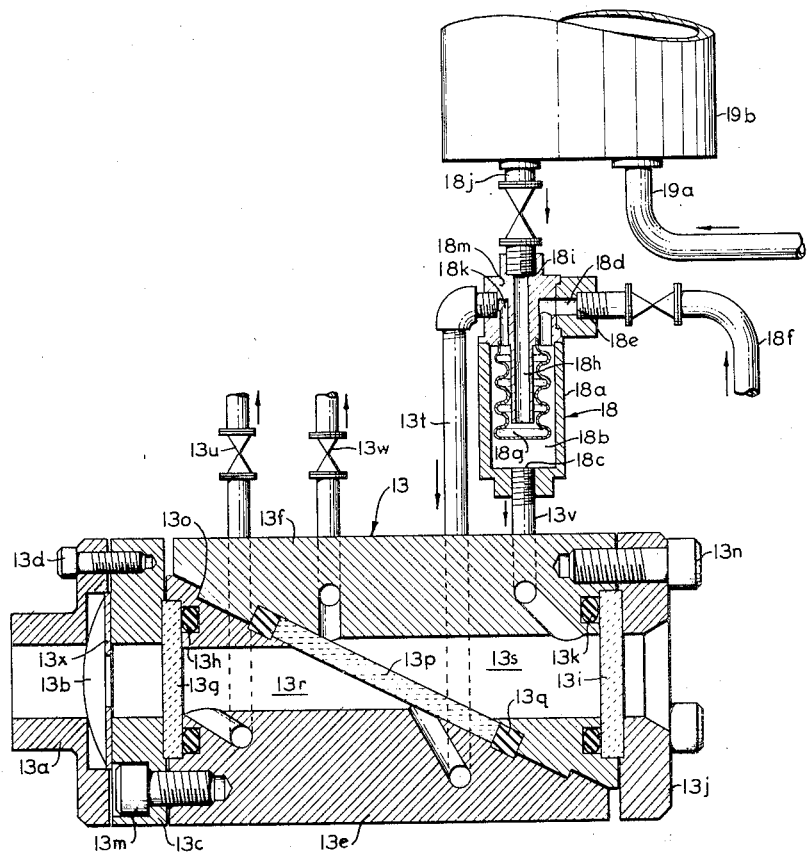
Figure 3 is a detail view of the differential refractometer cell together with a portion of the temperature and pressure regulating device.
Figure 5:
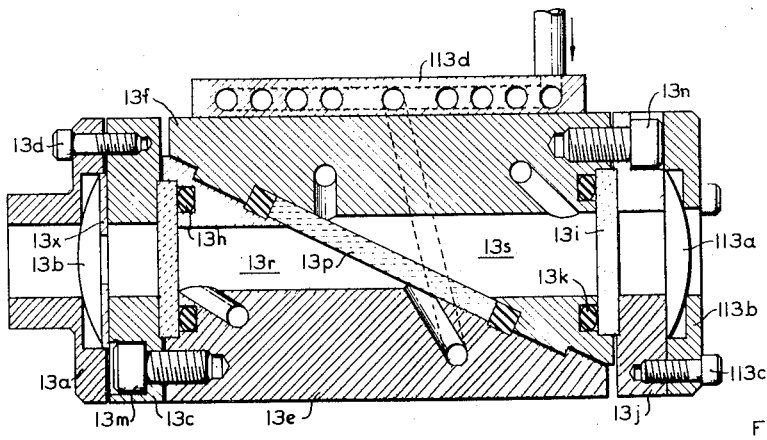
Figure 5 is a vertical sectional view of a modified form of refractometer cell.

Referring now to Figure 5, I have shown a modified cell assembly, parts similar to the cell assembly of Figure 3 being indicated by like reference characters. In this assembly, a lens 113a is provided opposite the lens 13b, this lens being secured in position by an end cap 113b secured to member 13j as by screws, one of which is shown at 113c. The cell assembly further includes a heat exchanger coil outside the blocks 13e and 13f, this coil being inserted at any suitable place in the conduit 20, Figure 1, so that circulation of cooling fluid therethrough tends to maintain the cell at a constant temperature. If desired, the heat exchanger coil 113d may be formed by boring suitable passages through the blocks 13e and 13f.

The purpose of the lens 113a, referring to Figure 6, is to produce a convergence of the light beam passing therethrough so that such beam falls upon a more restricted portion of the photovoltaic cells 17e and 17f than in Figure 4. This is well illustrated in the figure, wherein the folding of the beam produced by mirrors 15c and 16c has been omitted for clarity, and it will be noted that the light beam extends only a short distance upon each side of the junction between the cells 17e and 17f rather than falling upon a relatively large portion of the cells as in Figure 1. If the index of refraction of the fluid in cell 13r is greater than that of cell 13s, the beam is deflected upwardly, thereby causing the mirror to swing in a counterclockwise direction to center the beam upon the cells 17e and 17f, such rotation of the mirror operating potentiometer 23 in the manner previously described to produce an indication representative of the difference in indices of refraction. Conversely, if the index of refraction of the fluid in cell 13r is less than that in cell 13s, the beam is deflected downwardly so that a clockwise rotation of mirror 14d is necessary to cause the beam to fall in centered relationship upon the cells 17e and 17f, thereby moving the potentiometer 23 to a position representative of this difference in indices of refraction.

In Figure 7, I have illustrated a modification of the circuit of Figure 4 wherein photoconductive cells are substituted for the photovoltaic cells 17e and 17f. These cells, which are represented by resistances 135 and 136 in the drawing, are connected in a Wheatstone bridge circuit with balancing resistors 137 and 138, a battery 139 being connected between two opposite terminals of the bridge and the conductors 24, 25 being connected across the opposite terminals of the bridge. This circuit is particularly suitable for use with infra-red radiation wherein the cells 135, 136 can be bolometers. However, the described photoconductive cells may be any other type wherein the ohmic resistance of the cell varies with changes in intensity of the radiation incident thereon.

The circuit of Figure 7 is also suitable for use with photoemissive cells wherein a treated cathode mounted in a glass envelope emits electrons under action of radiation, these electrons being collected at an anode. Such tubes may be vacuum tubes or they may be gas filled. It will be understood, therefore, that the resistances 135 and 136 may represent photoemissive cells.

While the invention has been described in connection with present, preferred embodiments thereof, it is to be understood that this description is illustrative only and is not intended to limit the invention, the scope of which is defined by the appended claims.

I claim:

1. In a photometric analyzer, in combination, a radiation source, a twin detector unit, a radiation deflector, a unit comprising two cells each adapted to contain a fluid, means for directing radiation from said source through said cells to said deflector and, thence, to said detector units, a circuit connecting the electrical outputs of said twin detectors in opposition to produce a voltage representative of the ratio of radiation incident upon said twin detectors, a motor actuated by said voltage to rotate said deflector until the two detectors receive radiation in a predetermined ratio, a variable impedance unit mechanically connected to said motor, and means for recording variations in the impedance of said unit.

2. In a photometric analyzer, in combination, a radiation source, a twin detector unit, a reflector, a unit comprising two cells each adapted to contain a fluid, means for directing radiation from said source through said cells to said reflector and, thence, to said detector units, a circuit connecting the electrical outputs of said twin detectors in opposition to produce a voltage representative of the difference in amounts of radiation incident upon said twin detectors, a cam, a cam follower engageable with said cam and adapted to rotate said reflector, a motor for driving said cam, means for feeding said voltage to said motor, thereby to move said cam and said reflector until radiation is incident upon both detector units in equal amounts, a potentiometer having its contactor mechanically connected to said motor, means for producing a voltage drop across said potentiometer, and means for recording the voltage existing between the potentiometer contactor and one fixed terminal thereof.

3. Apparatus constructed in accordance with claim 2 in which the reflector is positioned closely adjacent said cells, and the optical path between the reflector and the twin detector unit is lengthened by a plurality of stationary reflectors.

4. Apparatus in accordance with claim 3 in which the radiation source produces visible light and the radiation detectors are photoelectric cells.

5. In a photometric analyzer, in combination, a radiation source, a twin detector unit, a unit comprising two cells each adapted to contain a fluid, means for directing radiation from said source through said cells to said detector unit, a radiation deflector positioned in the path of radiation from said source to said detector unit, a circuit connecting the electrical outputs of said twin detectors in opposition to produce a voltage representative of the ratio of radiation incident upon said twin detectors, a cam, a cam follower engageable with said cam and adapted to rotate said deflector, a motor for driving said cam, means for feeding said voltage to said motor, thereby to move said cam and said deflector until radiation is incident upon the detector units in a predetermined ratio, and means to measure the rotation of said motor.

6. An analyzer constructed in accordance with claim 5 in which the detectors are photoconductive cells.

7. An analyzer constructed in accordance with claim 5 in which the detectors are photovoltaic cells.

8. An analyzer constructed in accordance with claim 5 in which the detectors are photoemissive cells.

9. A photometric analyzer comprising, in combination, a radiation source; a reflector; a unit including two cells each adapted to contain a fluid, said unit comprising a pair of complementary blocks of metal shaped to form a central passage, a radiation transparent window at each end of said passage, a gasket interposed between each window and one of said blocks, an annular end plate pressing each window against its associated gasket, a plate of radiation transparent material positioned between portions of said blocks to divide said passage into two chambers, a gasket sealing the region between said last-mentioned plate and said blocks, and an inlet and an outlet for each chamber; a twin radiation detector unit; means for directing radiation from said source through said cells to said reflector and, thence, to said detector unit; a circuit connecting the electrical outputs of said twin detectors in opposition to produce a voltage representative of the difference in amounts of radiation incident upon said twin detectors; a motor actuated by said voltage to rotate said reflector until both detectors receive radiation of equal amounts; a variable impedance unit mechanically connected to said motor; and means for recording variations in the impedance of said impedance unit.

10. A photometric analyzer comprising, in combination, a radiation source; a reflector; a unit including two cells each adapted to contain a fluid, said unit comprising a metal structure shaped to form a central passage, radiation transparent means dividing said passage into a plurality of chambers, a liquid inlet and a liquid outlet for each chamber, said block being sufficiently massive as to permit efficient heat exchange between the liquids in said chambers, a vessel of large size as compared to the volume of said chambers connected to the inlet of one chamber, and means for introducing fluid into said chamber through said vessel; a twin radiation detector unit; means for directing radiation from said source through said cells to said reflector and, thence, to said detector unit; a circuit connecting the electrical outputs of said twin detectors in opposition to produce a voltage representative of the difference in amounts of radiation incident upon said twin detectors; a cam; a cam follower engageable with said cam and adapted to rotate said reflector; a motor for driving said cam; means for feeding said voltage to said motor; thereby to move said cam and said reflector until radiation is incident upon both detector units in equal amounts; a potentiometer having its contactor mechanically connected to said motor; means for producing a voltage drop across said potentiometer; and means for recording the voltage existing between the potentiometer contactor and one fixed terminal thereof.

11. Apparatus in accordance with claim 10 in which the radiation source provides visible light and the radiation detectors are photoelectric cells.

References Cited in the file of this patent

UNITED STATES PATENTS

| | | |
|---|---|---|
| 1,223,313 | Creveling | Apr. 17, 1917 |
| 1,264,374 | De Florez | Apr. 30, 1918 |
| 1,396,552 | Bossu | Nov. 8, 1921 |
| 1,465,214 | Forster | Aug. 14, 1923 |
| 2,413,208 | Barnes | Dec. 24, 1946 |
| 2,421,854 | Seaman | June 10, 1947 |
| 2,423,540 | Wills | July 8, 1947 |
| 2,427,996 | Seaman | Sept. 23, 1947 |
| 2,436,567 | Gould | Feb. 24, 1948 |
| 2,445,044 | Stamm et al. | July 13, 1948 |
| 2,457,747 | Sweet | Dec. 28, 1948 |
| 2,483,102 | Pierson | Sept. 27, 1949 |